United States Patent Office 2,876,038
Patented Mar. 3, 1959

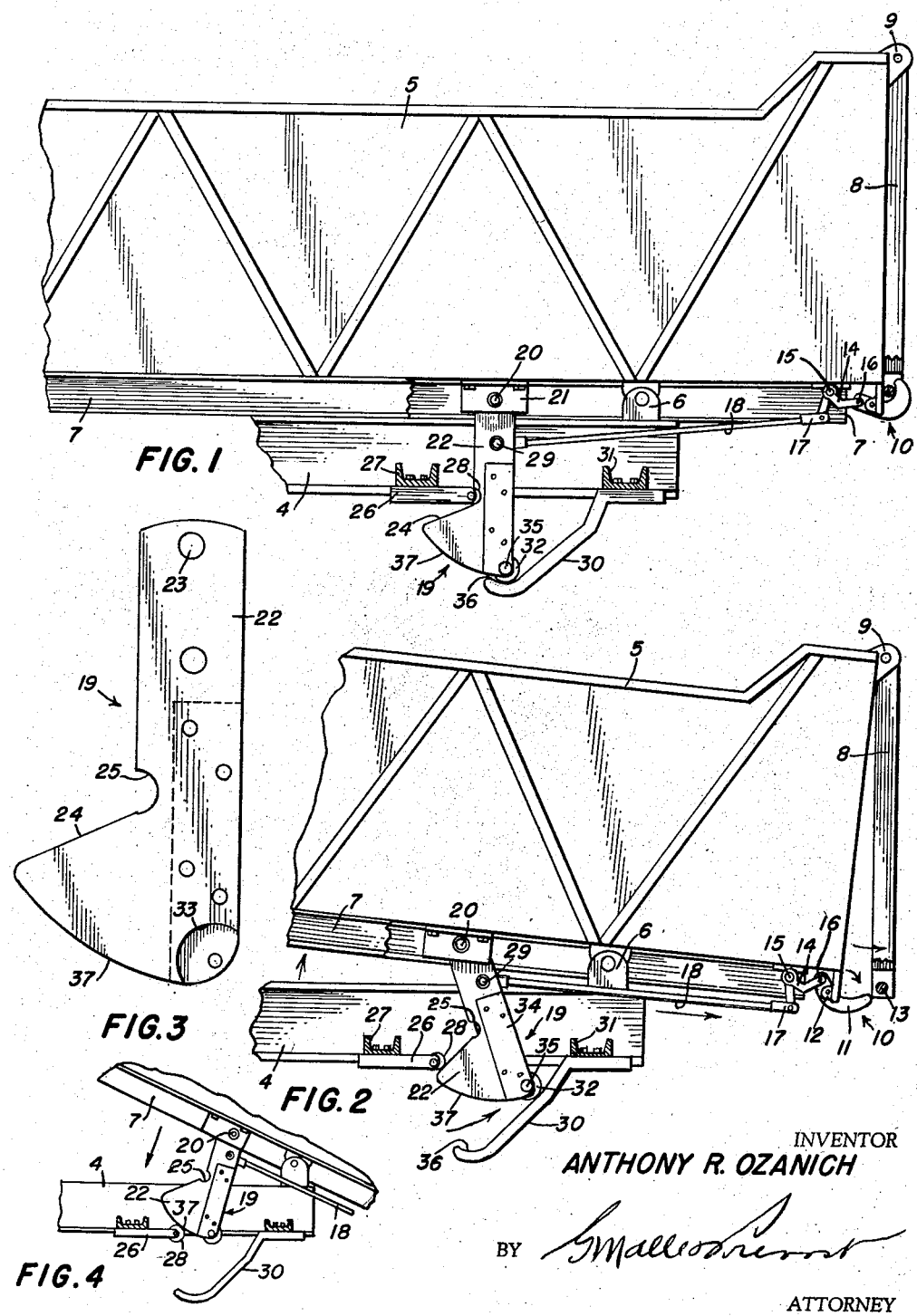
March 3, 1959 — A. R. OZANICH — 2,876,038
TAIL GATE LATCH CONTROL ASSEMBLY FOR TILTING DUMP TRUCKS
Filed July 15, 1954
INVENTOR
ANTHONY R. OZANICH

2,876,038

TAIL GATE LATCH CONTROL ASSEMBLY FOR TILTING DUMP TRUCKS

Anthony R. Ozanich, Engadine, Mich.

Application July 15, 1954, Serial No. 443,510

7 Claims. (Cl. 298—23)

This invention relates to a latch control mechanism for the tail gates of dump trucks of the type including a tiltable dump body having a pivotally mounted tail gate at the discharge end. More particularly, the invention consists in new and useful improvements in an automatic latch operating device for dump truck tail gates which is operable solely in response to the tilting movement of the dump body.

The primary object of the present invention is to provide an automatic latch control mechanism designed to relieve the truck operator of the necessity of manipulating hand levers and other manual controls, both in the unlocking and locking of the latch on the tail gate. The majority of conventional dump truck bodies are provided with a lever arm at the front of the box adjacent the cab, which is connected by a rearwardly extending rod, to the tail gate latch. In order to release the contents of the body, the driver must reach out and pull down this lever to trip the latch on the tail gate which swings open on its pivots and discharges the load as the box is raised by the hydraulic system of the truck. When the contents of the body are discharged, the box is lowered by the hydraulic system and in order to again secure the tail gate in locked position, the driver must again reach out and actuate the manual control lever.

This has been an extremely objectionable feature of dump trucks and although several efforts have been made to design mechanisms which minimize this objection, they have all proven unsatisfactory either by reason of complicated and expensive equipment involving a great many moving parts or by the continued requirement of a certain degree of manual control.

It is therefore an object of the present invention to completely overcome these disadvantages and to provide a latch control mechanism which is positively actuated both in locking and unlocking the tail gate latch, by a cam assembly controlled entirely by the tilting movement of the dump truck body.

A further object of the invention is the provision of a cam actuated latch control embodying a minimum of moving parts which can be installed on a conventional dump truck body without the necessity of major alterations.

Still another object of the invention is to provide a latch control mechanism which is extremely rugged in construction so as to withstand the hard usage generally expected of trucks of this nature, yet, is sufficiently sensitive in operation to insure positive action both in the unlocking and locking of the tail gate.

Another object of the invention is to provide a latch controlling cam arm which is pivotally suspended from the tiltable dump truck body and directly connected to the tail gate latch, a fixed guideway being provided on the sub-frame which is attached to the truck chassis, to positively control the movement of the arm on its pivot in response to vertical movement of the body in either direction.

With the above and other objects in view which will appear as the description proceeds, the invention consists in the novel features herein set forth, illustrated in the accompanying drawings and more particularly pointed out in appended claims.

Referring to the drawings in which numerals of like character designate similar parts throughout the several views, Figure 1 is a fragmentary view in side elevation, and partly in section, showing the improved latch control device with the tail gate in locked position.

Figure 2 is a similar view showing the dump truck body in partially elevated or tilted position, with the tail gate latch and latch control in unlocked position.

Figure 3 is an enlarged detail of the latch controlling cam arm with the near side plate removed to more clearly illustrate the contour of the cam arm, and Figure 4 is a side elevational view showing the position of the latch control on descent of the dump body.

In the drawings the sub-frame and dump body are illustrated more or less diagrammatically as their specific structures are not important to the real invention here involved. Ordinarily, a dump body chassis includes a pair of longitudinally extending I-beams or channel irons 4, transversely spaced by suitable cross members and fixed to the truck under-carriage (not shown), the tiltable dump body 5 being pivotally mounted at the rear end of the chassis, as at 6. This pivotal mounting may be of any conventional design, operatively connecting the sub-frame 7 of the dump body 5, to the rear end of the chassis 4, to permit the upward swinging or tilting of the body 5 about the pivot 6.

The rear end of the dump body 5 is provided with the usual tail gate 8, pivotally mounted as at 9 between the side walls of the body 5. A latch generally indicated by the numeral 10, is located on the dump body adjacent the lower edge of the tail gate 8. This latch assembly may be of any conventional design but for purposes of illustration, I have shown a hook-type latch member 11 pivotally mounted as at 12 on the under side of the dump body between the longitudinal sub-frame members 7. The latch member 11 is arranged to engage and disengage a latch bar 13, carried by the lower end of the tail gate 8. A crank arm 14 is pivotally mounted as at 15 on the under side of the dump body 5 and is operatively connected as at 16, to the latch 11, its opposite end being pivotally connected at 17 to a latch operating rod 18, hereinafter referred to more in detail.

As before stated all of the foregoing structures may be conventional and are shown diagrammatically in order to establish the environment of the present invention.

The latch operating assembly forming the basis of this invention, comprises a cam arm generally indicated by the numeral 19, said arm being pivotally suspended at 20 from the under side of the dump body 5, preferably between the longitudinal members 7. The pivotal mounting 20 may be in the form of suitable brackets 21 secured to the under side of the dump body by bolts or the like, the axis of the pivot 20 being transverse with respect to the dump body, so that the cam arm 19 may be swung forwardly or rearwardly under the influence of fixed guide elements to be described hereafter. More specifically, the cam arm 19 consists of a metal plate 22, having a transverse opening 23 at its upper end to receive the pivot 20 and as best seen in Figure 3, the forward edge of this plate is projected to form an inclined main cam surface 24, the upper end of which surface terminates in a notch 25 in the edge of the plate 22.

Coacting with the cam surface 24, is a cam follower or abutment 26 fixed to the chassis 4 by means of a cross channel or the like 27, the rear end of said cam follower, preferably carrying a cam guide roller 28 which is aligned for engagement with the main cam surface 24 and normally lies within the notch 25 of the cam arm, when the latter is in a vertical position or extends at substantially right angles with respect to the bottom of the dump body 5, as shown in Figure 1.

The plate 22 is pivotally connected at 29 to one end of the latch operating rod 18, the opposite end of which is pivoted to the crank arm 14 of the latch, as previously described. Thus, as the dump body 5 is swung upwardly on its pivot 6, by the hydraulic system, the plate 22 is caused to shift rearwardly on its pivot 20, by the camming action of the guide roller 28 on the cam follower 26, on the projected main cam surface 24, as shown in Figure 2, whereupon the latch mechanism 10 is released by the latch operating rod 19 and the connected crank arm 14.

The reverse or forward shifting movement of the cam arm 19 is caused by a similar camming action between the plate 22 and a forwardly and downwardly inclined cam shoe 30. This shoe 30 is preferably mounted on a cross channel 31, supported between the longitudinal members of the chassis 4, said cross channel 31 being spaced rearwardly from the cross channel 27 and the projecting extremity of the cam follower 26, so as to permit the passage of the flaring end of the plate 22 between the cam follower 26 and the shoe 30. In other words, the spaced cam follower and shoe form a fixed guideway for the cam arm.

In order to insure the smooth operation of the cam arm 19 between the opposed camming guides formed by the cam follower 26 and shoe 30, the lower rear edge of the plate 22 is provided with a cam follower in the form of a guide roller 32 which is rotatably supported in a complementary recess 33 in plate 22, by means of a pair of side strips 34 which may be bolted or otherwise secured on opposite sides of the plate 22, with their lower ends overlying the recess 33 and drilled to receive the axle 35 of the guide roller 32. The lower extremity of the forwardly and downwardly inclined cam surface of shoe 30 is preferably provided with a depression 36, adapted to receive the guide roller 32 when the latter is in its extreme downward position, said depression 36 being so spaced with respect to the roller 28 on the cam follower 26, that the two guide rollers 28 and 32 simultaneously come to rest respectively in the recess 25 of plate 22 and the depression 36 in shoe 30, when the dump body 5 is in its normal lowered position and the cam arm is vertical or in right angular relation to the bottom of the chassis 4. This will be clear from Figure 1 of the drawings.

Thus, as the dump body is lowered on its pivot 6, after discharging its load, its downward movement brings the guide roller 32 into engagement with the cam shoe 30 and as the roller rides downwardly on the cam shoe the cam arm plate 22 is cammed forwardly, bringing with it the latch operating rod 18 which returns the latch 10 to locked position with respect to the tail gate. It will be understood that upon lowering the dump body the tail gate 8 automatically returns to closed position by the force of gravity.

In order to insure the proper entry of the cam arm 19 between the guide ways formed by the cam follower 26 and the shoe 30, the lower edge of the flaring plate 22 is shaped in an arc to form an arm positioning cam surface as at 37, starting from the terminus of the inclined main cam surface 24 and extending to a point adjacent the guide roller 32. It will be apparent that during the dumping operation when the dump body 5 is in its extreme upward position, the force of gravity may cause the cam arm 19 to return to a vertical position after it has unlocked the latch 10 and pulled clear from the guide members 26 and 30. Upon the lowering of the dump body after discharging its load, the positioning cam surface 37 of the cam arm will engage the cam follower roller 28, whereby it is cammed rearwardly until the lower edge of the plate 22 enters the guideway between the cam follower 26 and the shoe 30. Thereafter, the continued downward movement of the dump body causes the cam arm 19 to be cammed forwardly by engagement of the cam follower roller 32 with the shoe 30, as previously described. As will be seen from Figure 1, when the dump body 5 has reached its extreme downward position and the cam arm 19 is at rest with the cam follower rollers 28 and 32 disposed in their respective recesses, the cam arm is held firmly between the fixed cam follower 26 and the fixed shoe 30. In fact, this firm engagement of the cam arm between its respective guide surfaces is maintained throughout the camming operation both in locking and unlocking the tail gate.

Thus, I have provided an extremely simple and inexpensive latch control mechanism which may be easily installed in connection with various conventional dump truck bodies, without any major alterations and with a minimum of expense. Aside from the conventional latch per se, their assembly includes only one truly working part, namely the cam arm 19 and consequently, the problem of maintenance and repair becomes inconsequential. However, despite the very simplicity of this structure, it is positive in action and capable of withstanding the extremely hard usage to which trucks of this nature are generally subjected.

From the foregoing it is believed that my invention may be readily understood by those skilled in the art without further description, it being borne in mind that numerous changes may be made in the details of construction without departing from the spirit of the invention as set forth in the following claims.

What I claim is:

1. In a dump truck body including a truck chassis, a dump body pivotally connected to said chassis adjacent the rear extremity thereof, on an axis perpendicularly transverse to said chassis, having a tail gate hinged on an axis parallel with that of the pivotal connection of said dump body, a latch adjacent a free edge of said tail gate and pivotally connected to said body on an axis parallel with said first-named pivotal connection, a latch control mechanism comprising a cam arm suspended from said dump body on an axis spaced forwardly of the pivotal connection of said dump body and parallel therewith, a rod connecting said arm to said latch, a main cam surface and a cam follower on said arm, a cam follower fixed on said chassis and engageable by said cam surface upon the upward tilting of said dump body, for camming said arm and rod in one direction, a cam shoe fixed to said chassis and engageable by the cam follower on said arm upon the descent of said dump body, for camming said arm and rod in the reverse direction, whereby said latch is respectively unlocked or locked in direct response to the upward or downward movement of said dump body, and a positioning cam surface on said cam arm, engageable with said fixed cam follower, to position said cam arm for entrance between said last named cam follower and said cam shoe, upon descent of said dump body.

2. In a dump truck body including a truck chassis, a dump body pivotally connected to said chassis adjacent the rear extremity thereof, on an axis perpendicularly transverse to said chassis, having a tail gate hinged on an axis parallel with that of the pivotal connection of said dump body, a latch adjacent a free edge of said tail gate and pivotally connected to said body on an axis parallel with said first-named pivotal connection, a latch control mechanism comprising a cam arm pivoted on an axis spaced forwardly of the pivotal connection of said dump body, parallel therewith and movable with said dump body, means operatively connecting said arm to said latch, a pair of opposed abutments fixed to said chassis and forming a cam guideway, adapted to receive said cam arm, complementary cam surfaces on adjacent engaging portions of said arm and guideway, for shifting said arm as it traverses said guideway in response to the raising and lowering of said dump body, and a positioning cam surface on said cam arm, engageable with one of said abutments to position said cam arm for entrance between said abutments, upon descent of said dump body.

3. Apparatus as claimed in claim 2, wherein at least one of each of the adjacent engaging portions is provided with an anti-friction roller.

4. A latch control assembly as claimed in claim 2, including a cam surface on one edge of said arm, engageable by one abutment, and a cam surface on the other abutment, engageable by the opposite edge of said arm.

5. A latch control assembly as claimed in claim 4, wherein an anti-friction roller is interposed between each abutment and the adjacent edge of said arm.

6. In a dump truck body including a truck chassis, a dump body pivotally connected to said chassis adjacent the rear extremity thereof, on an axis perpendicularly transverse to said chassis, having a tail gate hinged on an axis parallel with that of the pivotal connection of said dump body, a latch adjacent a free edge of said tail gate and pivotally connected to said body on an axis parallel with said first-named pivotal connection, a latch control mechanism comprising a cam arm suspended from said dump body on an axis spaced forwardly of the pivotal connection of said dump body and parallel therewith, the forward edge of said arm being projected forwardly at a downwardly inclined angle to form a cam surface, a cam follower fixed on said chassis and engageable by said cam surface upon the upward tilting movement of said body, for camming said arm rearwardly, a cam shoe fixed to said chassis in opposed relation to said follower and engageable by the lower rear portion of said arm upon the descent of said dump body, for camming said arm forwardly, and a rod connecting said arm to said latch, whereby said latch is respectively unlocked or locked in direct response to the upward or downward movement of said dump body.

7. Apparatus as claimed in claim 6, wherein the lower edge of said cam arm is provided with a positioning cam surface, engageable with said cam follower upon descent of said dump body.

References Cited in the file of this patent
UNITED STATES PATENTS

| | | |
|---|---|---|
| 1,456,630 | Eaton et al. | May 29, 1923 |
| 2,160,303 | Card | May 30, 1939 |
| 2,768,858 | Lauver | Oct. 30, 1956 |

FOREIGN PATENTS

| | | |
|---|---|---|
| 26,583 | Australia | May 9, 1930 |
| 553,565 | France | Feb. 13, 1923 |